US011285780B2

(12) United States Patent
Rodriguez

(10) Patent No.: US 11,285,780 B2
(45) Date of Patent: Mar. 29, 2022

(54) VEHICLE CLIMATE CONTROL ASSEMBLY

(71) Applicant: Samuel Rodriguez, Norristown, PA (US)

(72) Inventor: Samuel Rodriguez, Norristown, PA (US)

( * ) Notice: Subject to any disclaimer, the term of this patent is extended or adjusted under 35 U.S.C. 154(b) by 0 days.

(21) Appl. No.: 16/869,070

(22) Filed: May 7, 2020

(65) Prior Publication Data

US 2021/0347226 A1 Nov. 11, 2021

(51) Int. Cl.
*B60H 1/00* (2006.01)

(52) U.S. Cl.
CPC ..... *B60H 1/00807* (2013.01); *B60H 1/00278* (2013.01); *B60H 1/00821* (2013.01); *B60H 1/00878* (2013.01); *B60H 1/00985* (2013.01)

(58) Field of Classification Search
CPC ............ B60H 1/00807; B60H 1/00278; B60H 1/00878; B60H 1/00985; B60H 2001/00242
See application file for complete search history.

(56) References Cited

U.S. PATENT DOCUMENTS

| | | | | |
|---|---|---|---|---|
| D284,025 S | | 5/1986 | Armstrong | |
| 4,658,599 A | | 4/1987 | Kajiwara | |
| 4,909,044 A | * | 3/1990 | Gudmundsen | B60H 1/00007 165/43 |
| 5,259,814 A | * | 11/1993 | Weissbrich | B60H 1/00807 236/49.3 |
| 6,253,560 B1 | * | 7/2001 | Cava | F28D 15/02 62/119 |
| 6,439,658 B1 | * | 8/2002 | Ganz | B60H 1/00285 297/180.14 |
| 6,453,678 B1 | | 9/2002 | Sundhar | |
| 6,474,089 B1 | | 11/2002 | Chen | |
| 6,662,572 B1 | | 12/2003 | Howard | |
| 6,808,450 B2 | | 10/2004 | Snow | |
| 7,836,705 B2 | | 11/2010 | Teschner | |
| 8,316,650 B2 | | 11/2012 | Yang | |
| 8,418,477 B2 | | 4/2013 | Klein | |
| 9,440,525 B1 | | 9/2016 | Baty | |

(Continued)

FOREIGN PATENT DOCUMENTS

| | | | |
|---|---|---|---|
| CN | 107264460 A | * | 10/2017 |
| CN | 107471964 A | * | 12/2017 |
| CN | 108674128 A | * | 10/2018 |

*Primary Examiner* — Nelson J Nieves

(57) ABSTRACT

A vehicle climate control assembly for modulating a temperature of a passenger compartment includes a solar panel, a battery, a heating and cooling unit, a temperature sensor, and a controller, all of which are mountable to a vehicle. The battery is operationally engaged to the solar panel, which is mountable to an exterior surface of the vehicle. The heating and cooling unit is in fluidic communication with the passenger compartment of the vehicle and is operationally engaged to the battery. The temperature sensor and the controller are mountable within the passenger compartment. The controller is operationally engaged to the solar panel, the battery, the heating and cooling unit, and the temperature sensor. The temperature sensor measures a temperature of the air in the passenger compartment, positioning the controller to selectively actuate the heating and cooling unit to modulate the temperature within the passenger compartment.

9 Claims, 4 Drawing Sheets

(56) References Cited

U.S. PATENT DOCUMENTS

| | | | | |
|---|---|---|---|---|
| 2004/0065101 | A1* | 4/2004 | Krupp | B60H 1/00592 62/244 |
| 2007/0015451 | A1* | 1/2007 | McGrath, Jr. | B60H 1/00742 454/75 |
| 2008/0078193 | A1* | 4/2008 | Lin | B60H 1/3222 62/235.1 |
| 2009/0286459 | A1* | 11/2009 | Major | B60H 1/00778 454/75 |
| 2010/0031682 | A1* | 2/2010 | Gaerlan | B60H 1/00428 62/228.1 |
| 2010/0294455 | A1* | 11/2010 | Yang | B60H 1/00285 165/42 |
| 2011/0165829 | A1* | 7/2011 | Nefcy | H01M 10/625 454/75 |
| 2015/0127215 | A1* | 5/2015 | Chatterjee | B60R 16/037 701/36 |
| 2016/0152112 | A1* | 6/2016 | Stetler | B60H 1/00428 62/235.1 |
| 2016/0355072 | A1* | 12/2016 | Park | B60H 1/00899 |
| 2017/0036512 | A1* | 2/2017 | Willard, Jr. | B60H 1/00735 |
| 2018/0001742 | A1* | 1/2018 | Vehr | F25B 47/006 |
| 2018/0141414 | A1* | 5/2018 | Lota | B60H 1/00985 |
| 2018/0266834 | A1* | 9/2018 | Cronin | G08G 1/096827 |
| 2018/0370431 | A1* | 12/2018 | Wincek | G01V 3/088 |
| 2019/0176565 | A1* | 6/2019 | Shin | B60H 1/00878 |
| 2021/0070143 | A1* | 3/2021 | Ton | B60H 1/00564 |

* cited by examiner

VEHICLE CLIMATE CONTROL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to climate control assemblies and more particularly pertains to a new climate control assembly for modulating a temperature of a passenger compartment.

(2) Description of Related Art Including Information Disclosed Under 37 CFR 1.97 and 1.98

The prior art relates to climate control assemblies. Prior art climate control assemblies engageable to a vehicle may comprise solar powered air conditioners, solar powered fans, solar powered heating elements, and solar powered thermo-electric units.

BRIEF SUMMARY OF THE INVENTION

An embodiment of the disclosure meets the needs presented above by generally comprising a solar panel, a battery, a heating and cooling unit, a temperature sensor, and a controller, all of which are configured to be mountable to a vehicle. The battery is operationally engaged to the solar panel, which is configured to be mounted to an exterior surface of the vehicle. The heating and cooling unit is in fluidic communication with a passenger compartment of the vehicle and is operationally engaged to the battery. The temperature sensor and the controller are configured to be mounted within the passenger compartment. The controller is operationally engaged to the solar panel, the battery, the heating and cooling unit, and the temperature sensor. The temperature sensor is configured to measure a temperature of the air in the passenger compartment, positioning the controller to selectively actuate the heating and cooling unit to modulate the temperature within the passenger compartment.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
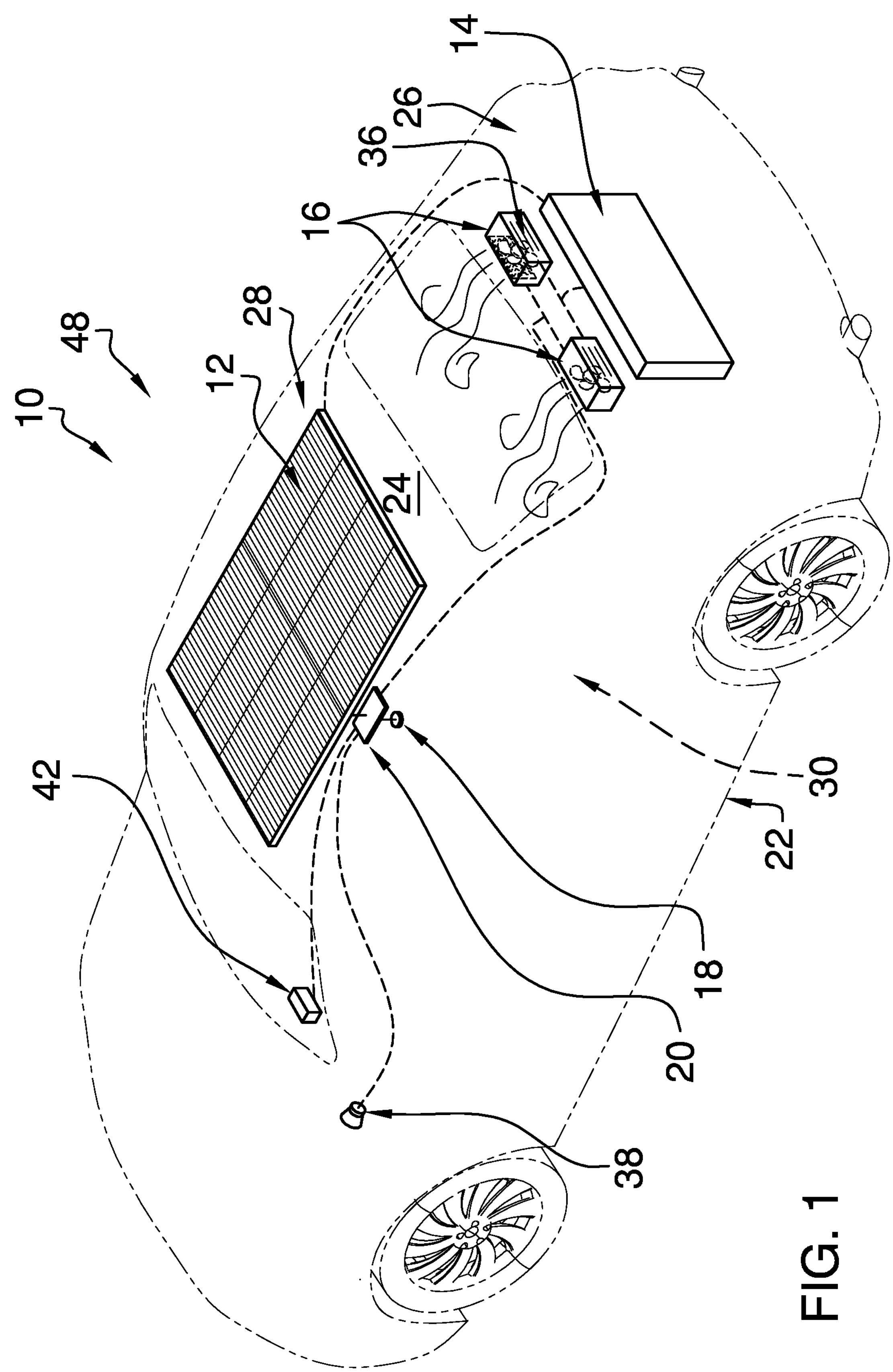
FIG. 1 is an isometric perspective view of a vehicle climate control assembly according to an embodiment of the disclosure.

With reference now to the drawings, and in particular to FIGS. 1 through 4 thereof, a new climate control assembly embodying the principles and concepts of an embodiment of the disclosure and generally designated by the reference numeral 10 will be described.

Figure 2:
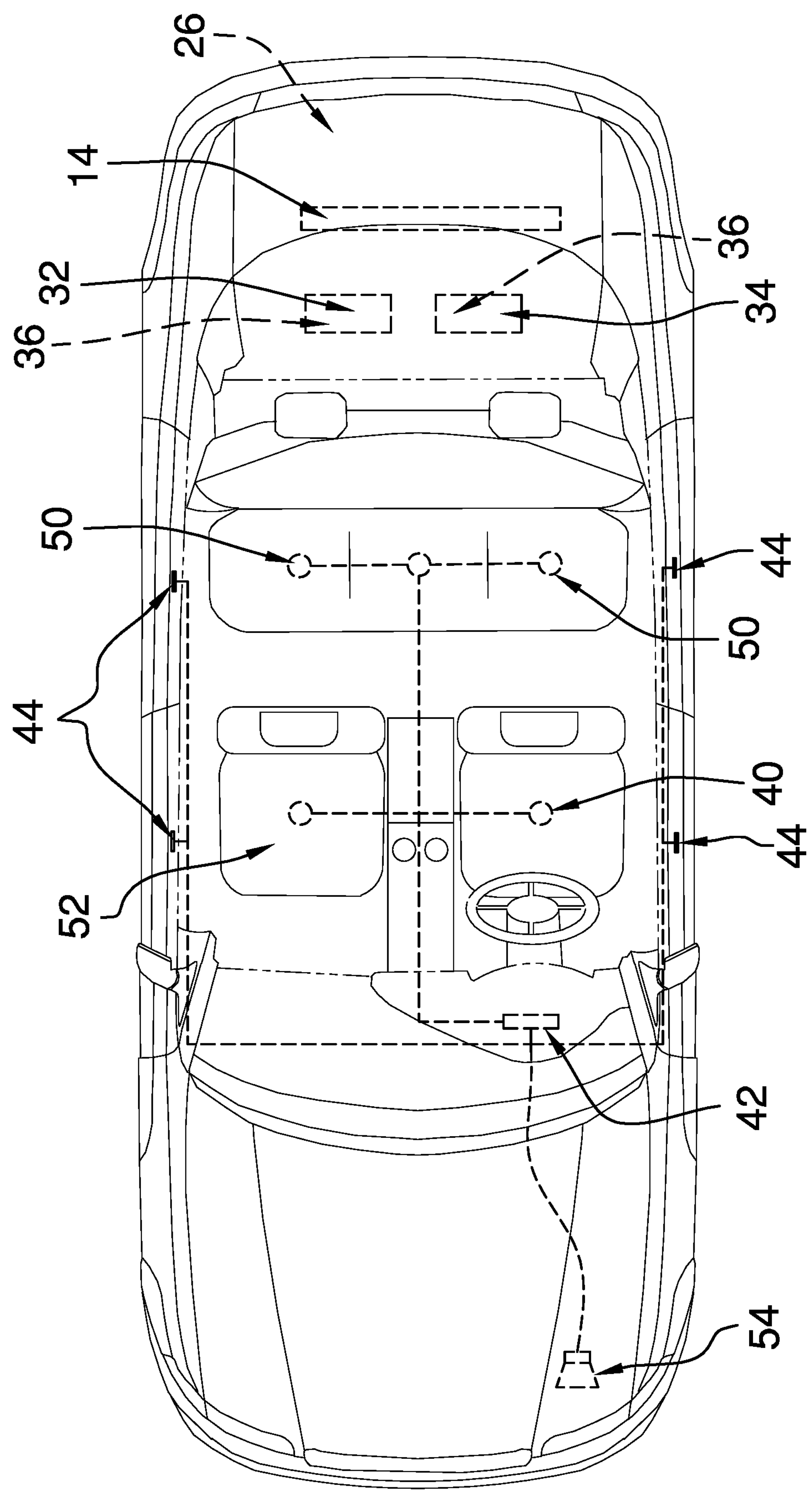
FIG. 2 is a top view of an embodiment of the disclosure.

As best illustrated in FIGS. 1 through 4, the vehicle climate control assembly 10 generally comprises a solar panel 12, a battery 14, a heating and cooling unit 16, a temperature sensor 18, and a controller 20, all of which are configured to be mountable to a vehicle 22. The battery 14 is operationally engaged to the solar panel 12, which is configured to be mounted to an exterior surface 24 of the vehicle 22. The battery 14 may be configured to be mountable to the vehicle 22 within a trunk 26 thereof, as shown in FIG. 2, or other elements of the vehicle 22, such as, but not limited to, engine compartments, truck beds, and the like.

The solar panel 12 may be configured to be mountable to a roof 28 of the vehicle 22, as shown in FIG. 1. The solar panel 12 also may be configured to be mountable other elements of the vehicle 22, such as, but not limited to, hoods, trunk lids, and the like.

The heating and cooling unit 16 is in fluidic communication with a passenger compartment 30 of the vehicle 22 and is operationally engaged to the battery 14. The heating and cooling unit 16 comprises a heating module 32 and a cooling module 34. Each of the heating module 32 and the cooling module 34 have a blower 36 integral thereto. The blower 36 is configured to motivate air from the heating and cooling unit 16 into the passenger compartment 30.

The temperature sensor 18 and the controller 20 are configured to be mounted within the passenger compartment 30. The controller 20 is operationally engaged to the solar panel 12, the battery 14, the heating and cooling unit 16, and the temperature sensor 18. The temperature sensor 18 is configured to measure a temperature of the air in the passenger compartment 30, positioning the controller 20 to selectively actuate the heating and cooling unit 16 to modulate the temperature within the passenger compartment 30. The controller 20 maintains the temperature within a comfortable range, perhaps 70-75° F. in summer months and 60-65° F. in winter months.

Figure 3:
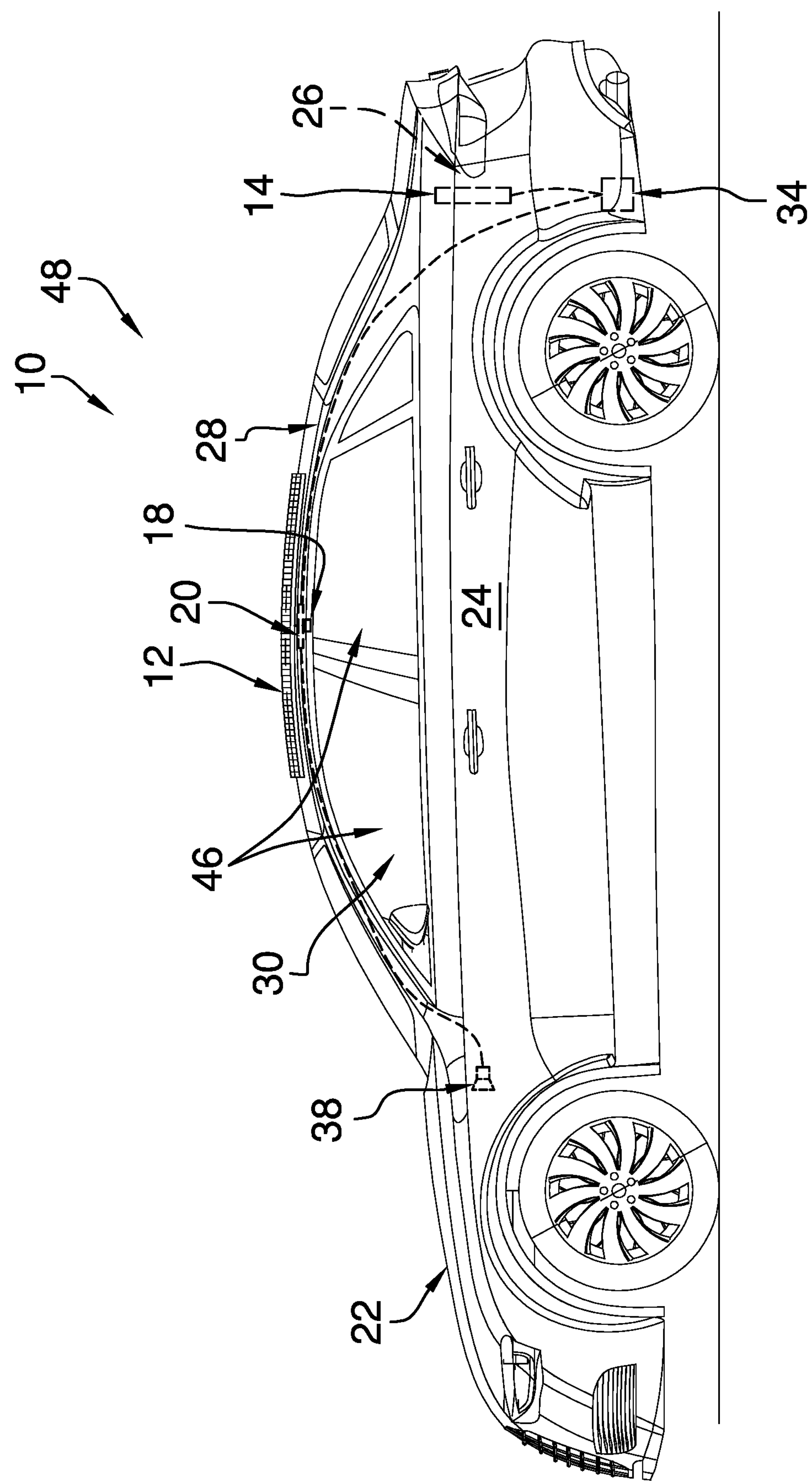
FIG. 3 is a side view of an embodiment of the disclosure.
Figure 4:
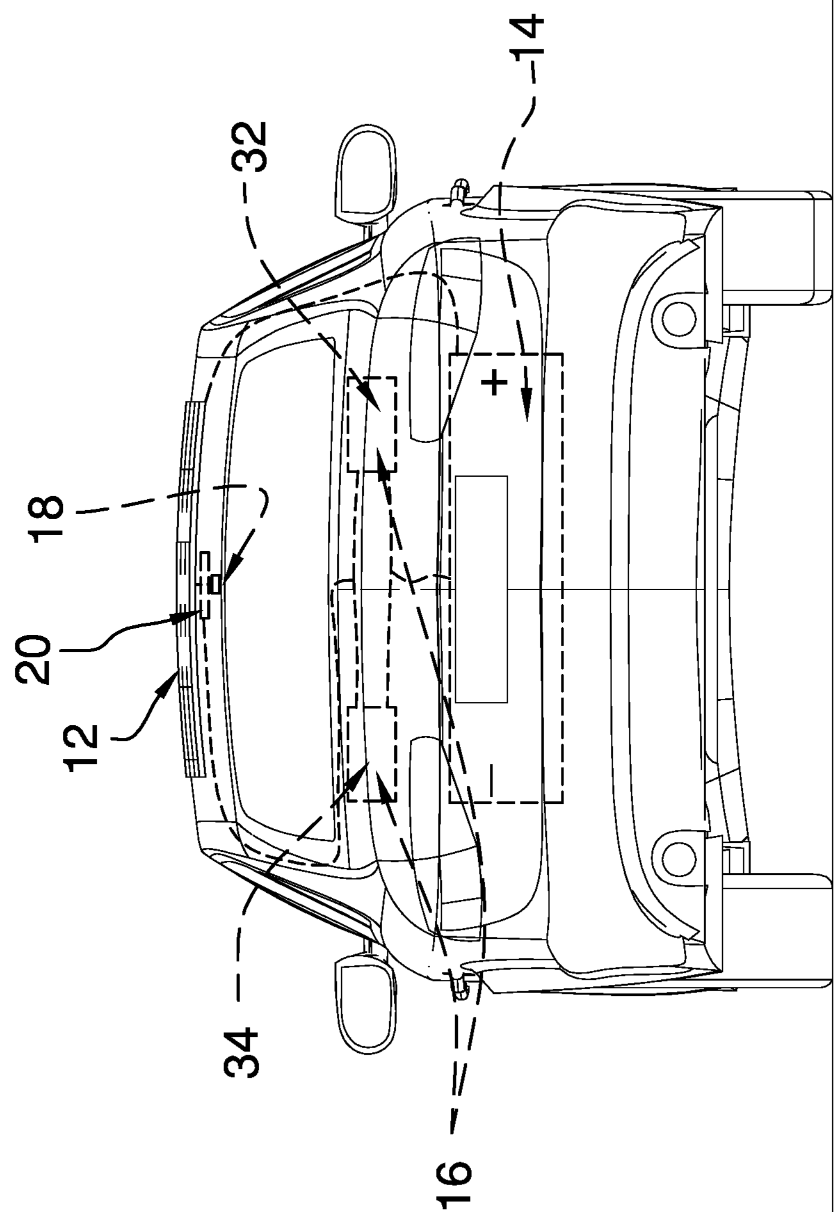
FIG. 4 is a back view of an embodiment of the disclosure.

The assembly 10 also may comprise an alarm 38, which is configured to be mountable to the vehicle 22, as shown in FIG. 3. The alarm 38 is operationally engaged to the controller 20. The controller 20 is positioned to actuate the alarm 38 in event the temperature within the passenger compartment 30 is outside a predetermined range. The alarm 38 alerts a person proximate to the vehicle 22 of a failure to control the temperature with the passenger compartment 30. In the event an occupant is positioned in the vehicle 22, the person proximate to the vehicle 22 can provide assistance, if required.

The assembly 10 also may comprise an occupancy sensor 40, which configured to be mountable to the vehicle 22 within the passenger compartment 30. The occupancy sensor 40 is configured to detect the occupant who is positioned in the vehicle 22. The controller 20 may be configured to be operationally engaged to an electronic control unit 42 of the vehicle 22. The controller 20 thus is configured to selectively actuate window controls 44 of the vehicle 22 to selectively position windows 46 of the vehicle 22, should the temperature within the passenger compartment 30 exceed an upper limit of the predetermined range.

The present invention also anticipates a vehicle and vehicle climate control assembly combination 48, wherein the solar panel 12 is at least one of mounted to and integral to the roof 28 of the vehicle 22. The battery 14 is mounted to the vehicle 22 and is operationally engaged to the solar panel 12. The battery 14 may be mounted to the vehicle 22 within the trunk 26, as shown in FIG. 2, or other elements of the vehicle 22, such as, but not limited to, engine compartments, truck beds, and the like.

The heating and cooling unit 16 is mounted to the vehicle 22 and is in fluidic communication with the passenger compartment 30. The heating and cooling unit 16 is operationally engaged to the battery 14. The heating and cooling unit 16 comprises the heating module 32 and the cooling module 34. Each of the heating module 32 and the cooling module 34 have a respective blower 36 integral thereto. The respective blower 36 is configured to motivate air from the heating and cooling unit 16 into the passenger compartment 30.

The temperature sensor 18 and the controller 20 are mounted to the vehicle 22 within the passenger compartment 30. The controller 20 is operationally engaged to the solar panel 12, the battery 14, the heating and cooling unit 16, and the temperature sensor 18. The temperature sensor 18 is configured to measure the temperature of the air in the passenger compartment 30. The controller 20 is positioned to selectively actuate the heating and cooling unit 16 to modulate the temperature within the passenger compartment 30.

The combination 48 also may comprise the alarm 38, which is mounted to the vehicle 22 and is operationally engaged to the controller 20. The controller 20 is positioned to actuate the alarm 38 in event the temperature within the passenger compartment 30 is outside the predetermined range. The person proximate to the vehicle 22 is alerted to the failure to control the temperature with the passenger compartment 30. The alarm 38 may comprise a horn 54 of the vehicle 22.

The combination 48 also may comprise the occupancy sensor 40, which is mounted to the vehicle 22 within the passenger compartment 30. The occupancy sensor 40 is operationally engaged to the controller 20 and is positioned to detect the occupant who is positioned in the vehicle 22. The occupancy sensor 40 may comprise a pressure sensor 50, which is positioned in a seat 52 of the vehicle 22, as shown in FIG. 2. The occupancy sensor 40 also may comprise other sensing means, such as, but not limited to, motion sensors, proximity sensors, and the like.

The controller 20 may be operationally engaged to the electronic control unit 42 of the vehicle 22. The controller 20 thus is positioned to selectively actuate the window controls 44 of the vehicle 22 to selectively position the windows 46 of the vehicle 22 should the temperature within the passenger compartment 30 exceed the upper limit of the predetermined range.

In use, the temperature sensor 18 monitors the temperature of the air in the passenger compartment 30. When required, the controller 20 selectively actuates the heating and cooling unit 16 to modulate the temperature within the passenger compartment 30.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A vehicle and vehicle climate control assembly combination comprising:

a vehicle;

a solar panel mounted to an exterior surface of a vehicle;

a battery mounted to the vehicle and being operationally engaged to the solar panel;

a heating and cooling unit mounted to the vehicle such that the heating and cooling unit is in fluidic communication with a passenger compartment of the vehicle, the heating and cooling unit being operationally engaged to the battery, the heating and cooling unit comprising a heating module and a cooling module, each of the heating module and the cooling module having a blower integral thereto, wherein the blower is configured for motivating air from the heating and cooling unit into the passenger compartment, the heating module and the cooling module being separate from each other, positioned within the passenger compartment, and positioned in spaced relationship to each other proximate to a rear of the vehicle; and a temperature sensor and a controller mounted to the vehicle within the passenger compartment, the controller being operationally engaged to the solar panel, the battery, the heating and cooling unit, and the temperature sensor, wherein the temperature sensor is configured for measuring a temperature of the air in the passenger compartment, positioning the controller for selectively actuating the heating and cooling unit for modulating the temperature within the passenger compartment.

2. The vehicle and vehicle climate control assembly combination of claim 1, wherein the solar panel is at least one of mounted to and integral to a roof of the vehicle.

3. The vehicle and vehicle climate control assembly combination of claim 1, wherein the battery is mounted to the vehicle within a trunk thereof.

4. The vehicle and vehicle climate control assembly combination of claim 1, further including an alarm mounted to the vehicle, the alarm being operationally engaged to the controller, such that the controller is positioned for actuating the alarm in event the temperature within the passenger compartment is outside a predetermined range, for alerting a person proximate to the vehicle of a failure to control the temperature with the passenger compartment.

5. The vehicle and vehicle climate control assembly combination of claim 4, wherein the alarm comprises a horn of the vehicle.

6. The vehicle and vehicle climate control assembly combination of claim 1, further including an occupancy sensor mounted to the vehicle within the passenger compartment, the occupancy sensor being operationally engaged to the controller, such that the occupancy sensor is positioned for detecting an occupant positioned in the vehicle.

7. The vehicle and vehicle climate control assembly combination of claim 6, wherein the occupancy sensor comprises a pressure sensor positioned in a seat of the vehicle.

8. The vehicle and vehicle climate control assembly combination of claim 1, wherein the controller is operationally engaged to an electronic control unit of the vehicle, such that the controller is positioned for selectively actuating window controls of the vehicle for selectively positioning the windows should the temperature within the passenger compartment exceed an upper limit of the predetermined range.

9. A vehicle climate control assembly comprising:

a solar panel configured to be mountable to an exterior surface of a vehicle, the solar panel being configured to be mountable to a roof of the vehicle;

a battery configured to be mountable to the vehicle, the battery being operationally engaged to the solar panel, the battery being configured to be mountable to the vehicle within a trunk thereof;

a heating and cooling unit configured to be mountable to the vehicle such that the heating and cooling unit is in fluidic communication with a passenger compartment of the vehicle, the heating and cooling unit being operationally engaged to the battery, the heating and cooling unit comprising a heating module and a cooling module, each of the heating module and the cooling module having a blower integral thereto, wherein the blower is configured for motivating air from the heating and cooling unit into the passenger compartment, the heating module and the cooling module being separate from each other, positioned within the passenger compartment, and positioned in spaced relationship to each other proximate to a rear of the vehicle;

an alarm configured to be mountable to the vehicle;

an occupancy sensor configured to be mountable to the vehicle within the passenger compartment, wherein the occupancy sensor is configured for detecting an occupant positioned in the vehicle; and a temperature sensor and a controller configured to be mountable to the vehicle within the passenger compartment, the controller being operationally engaged to the solar panel, the battery, the heating and cooling unit, the alarm, the occupancy sensor, and the temperature sensor, wherein the temperature sensor is configured for measuring a temperature of the air in the passenger compartment, positioning the controller for selectively actuating the heating and cooling unit for modulating the temperature within the passenger compartment, such that the controller is positioned for actuating the alarm in event the temperature within the passenger compartment is outside a predetermined range, for alerting a person proximate to the vehicle of a failure to control the temperature with the passenger compartment, the controller being configured to be operationally engaged to an electronic control unit of the vehicle, wherein the controller is configured for selectively actuating window controls of the vehicle for selectively positioning windows of the vehicle should the temperature within the passenger compartment exceed an upper limit of the predetermined range.

* * * * *